United States Patent
Berglund et al.

(10) Patent No.: US 8,412,117 B2
(45) Date of Patent: Apr. 2, 2013

(54) METHOD AND ARRANGEMENT FOR IMPROVED FEEDER SHARING IN A TELECOMMUNICATION SYSTEM

(75) Inventors: Bo G Berglund, Jarfalla (SE); Ulf Bertil Christian Skarby, Lidingo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1505 days.

(21) Appl. No.: 11/917,776

(22) PCT Filed: Jun. 17, 2005

(86) PCT No.: PCT/SE2005/000938
§ 371 (c)(1),
(2), (4) Date: Dec. 17, 2007

(87) PCT Pub. No.: WO2006/135288
PCT Pub. Date: Dec. 21, 2006

(65) Prior Publication Data
US 2008/0267097 A1    Oct. 30, 2008

(51) Int. Cl.
*H04B 1/38* (2006.01)

(52) U.S. Cl. ......... 455/73; 455/562.1; 455/561; 455/78; 455/101; 455/103; 455/132

(58) Field of Classification Search ................. 455/13.3, 455/307, 456.5, 524, 525, 561, 562.1
See application file for complete search history.

(56) References Cited

U.S. PATENT DOCUMENTS

| | | | |
|---|---|---|---|
| 4,970,479 A * | 11/1990 | Landt et al. | 333/101 |
| 2002/0009982 A1 * | 1/2002 | Kim | 455/135 |
| 2004/0214608 A1 * | 10/2004 | Mostafa et al. | 455/562.1 |
| 2005/0136875 A1 | 6/2005 | Skarby | |

* cited by examiner

*Primary Examiner* — Edward Urban
*Assistant Examiner* — Mohammed Rachedine
(74) *Attorney, Agent, or Firm* — Roger S. Burleigh (57) ABSTRACT

A filter arrangement (EFM) comprises a first terminal (T1) arranged for handling duplex radio antenna feeder signals for at least two transceiver modules (10, 20), a second terminal (T2) arranged for handling at least duplex signals for a first transceiver module (10), a third terminal (T3) arranged for outputting a first multi carrier power amplifier system input signal, said input signal representing a transmit signal from said first transceiver module (10), a fourth terminal (T4) arranged for receiving a multi carrier power amplifier system output signal, said output signal comprising an amplified representation of the transmit signals from said at least two transceiver modules, and wherein said first and said second terminal (T1, T2) are connected via first single filter means (RX), said second and said third terminal (T2, T3) are connected via second single filter means (TX1), said fourth and said first terminal (T4, T1) are connected via third single filter means (TX2).

15 Claims, 12 Drawing Sheets

METHOD AND ARRANGEMENT FOR IMPROVED FEEDER SHARING IN A TELECOMMUNICATION SYSTEM

TECHNICAL FIELD

The present invention relates to communication systems in general, specifically to methods and arrangements enabling feeder sharing multiple transceiver modules in such systems.

BACKGROUND

A major contribution to the cost for a single base station is the cost of the antenna structure used to transmit/receive radio frequency signals from/to the base station. In order to reduce the cost of establishing a communication network, it is becoming more and more common to share or co-site; e.g. antenna structures between multiple base stations, recognizing the different communication systems will transmit/receive on different radio frequencies.

Despite the filtering circuitry of individual base stations and transmit amplifier specifications which limit acceptable spurious noise levels at frequencies outside the allocated block of spectrum, the frequency bandwidths allocated to different communication systems may be near enough that the conventional implemented filtering performed by each base station will be insufficient to prevent interference between the communication signals of each wireless system in a shared antenna environment. Additionally, the physical connection of transmission lines from multiple base stations at a common connection point will generally cause considerable power loss i.e. insertion loss attributable to the transmit/receive signal of one system feeding into the transmission line of the second system. Such insertion loss will require increased power and/or a higher gain antenna structure to achieve acceptable signal-to-noise characteristics.

One specific problem for sharing one antenna is the problem of separating the signals to be transmitted from the antenna from the signals received at the antenna. Another problem is how to separate the respective signals to and from the respective co-sited base stations.

According to prior art this can be achieved with the use of so called duplex filters. Duplex filters combine the transmitter and receiver signals of a specific frequency band into a common signal. The filters are usually built into the base stations, but can also be used as external components in the antenna system. Such a filter arrangement typically has a first band pass filter which passes frequencies in the transmit band and a second band pass filter which passes frequencies in the receive band.

Also, the physical connection of transmission lines from multiple base stations to a common connection point will cause considerable power loss, thus requiring increased power and/or a higher gain antenna structure to achieve acceptable signal-to-noise characteristics. In prior art this has been achieved by supplying the transmitted signals to a multi carrier power amplifier structure, enabling amplification of the individual transmitted signals.

Therefore, there is a need for solutions for enabling co-siting or feeder sharing of base stations while maintaining a tolerable level of insertion loss and a tolerable accuracy in the transmit power.

SUMMARY

An object of the present invention is to provide methods and arrangements for improved combination of communications of base stations of multiple wireless systems on the same antenna structure.

A specific object is to enable antenna feeder sharing of multiple wireless systems within one base station.

Another specific object of the present invention is to enable improved feeder sharing in a communication system.

A further specific object is to enable feeder sharing with reduced loss in the receive-path.

Another specific object is to enable feeder sharing with improved accuracy in the transmit-path.

Yet another specific object is to enable simplified system architecture for feeder sharing.

A further object is to enable a filter arrangement for feeder sharing with multi carrier power amplifier systems These and other objects are achieved in accordance with the attached claims.

Briefly, the present invention comprises introducing a single filter arrangement connecting an antenna feeder system to a respective transceiver module and a multi carrier power amplifier system for amplifying the transmit signals.

Specifically, a general embodiment of the present invention comprises an external filter module EFM which comprises one terminal for handling duplex radio antenna feeder signals for multiple transceiver modules, one terminal for handling at least duplex signals for a first transceiver module, one terminal for providing a first multi carrier power amplifier system input signal representing a transmit signal from the first transceiver module, one terminal for receiving a multi carrier power amplifier system output signal comprising an amplified representation of the transmit signals from the at least two transceiver modules; and where the first terminal and said second terminal are connected via a first single filter, the second terminal and the third terminal are connected via a second single filter, and the fourth terminal and the first terminal are connected via a third single filter.

More specifically, the external filter arrangement according to a specific embodiment comprises feedback means arranged at the first terminal to provide feedback to power adjustment units arranged to affect first and second multi carrier power amplifier system input signals.

In addition, the invention comprises methods of transmitting and receiving signals for multiple feeder sharing transceiver modules.

Advantages of the present invention include:
Reduced insertion loss for the receiver path;
Increased power accuracy of the transmit path;
Simplified filter architecture;

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention will be described in the context of feeder sharing base stations utilizing GSM, however the invention is equally applicable to other network technologies such as TDMA, OFDM, WCDMA, Multi Carrier-WCDMA, OFDMA etc. Also, a mix of different network technologies is possible.

There are several known techniques for enabling two or more base stations, or two or more telecommunication system within one base station, to share a common antenna feeder. One of which is utilizing duplex filters and a multi carrier power amplifier (MCPA).

Figure 1:
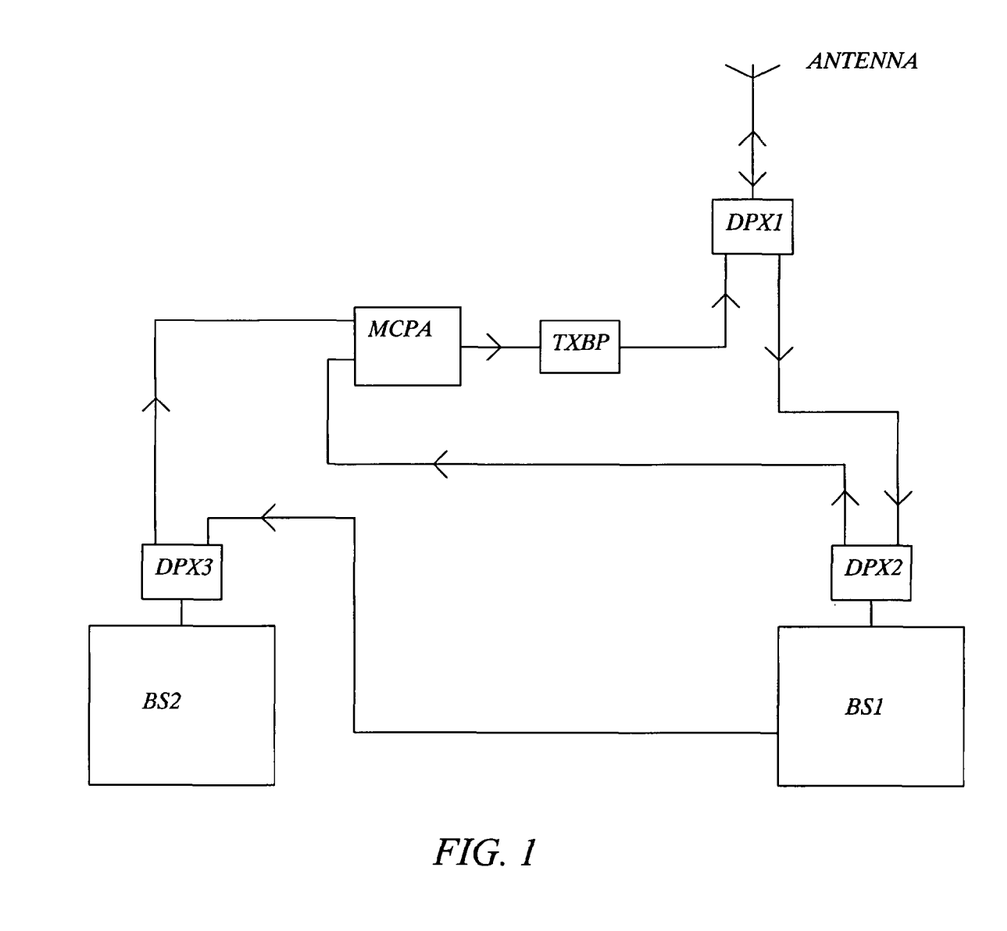
FIG. 1 illustrates feeder sharing according to prior art.

According to prior art, see FIG. 1, a terminal of a first duplex filter DPX1 is connected to an antenna feeder in order to enable separation of outgoing transmit- and incoming receive-signals on the antenna. An output terminal of the first duplex filter DPX1 is connected to an input terminal of a second duplex filter DPX2, which in turn is connected with a terminal to a terminal of a first base station BS1. An output terminal of the first base station BS1 is connected to an input terminal of a third duplex filter DPX3 connected to a terminal of a second base station BS2. An output terminal of the second duplex filter DPX2 is connected to a first input of a multi carrier power amplifier system MCPA. An output terminal of the third duplex filter DPX3 is connected to a second input terminal of the multi carrier power amplifier. The output terminal of the multi carrier power amplifier is connected to a transmitter filter unit TXBP, which is connected to an input terminal of the first duplex filter DPX1.

A signal received at the antenna is fed to the first duplex filter DPX1 and continues via a connecting cable to the second duplex filter DPX2, which is connected to an input/output terminal of the first base station BS1. The base station BS1 also comprises a coupler for relaying received signals intended for the second base station BS2. If a received signal is destined for the second base station BS2, the signal is fed from the coupler of the first base station BS1 to the third duplex filter DPX3. Finally the received signal ends up at an input/output of the destination base station BS2.

On its way from the antenna the received signal has thus passed through: DPX1-cable-DPX2-BS1-DPX3-BS2 (if intended for second base station). The most serious loss results from the first and second duplex filter DPX1, DPX2 and the cable connecting the two. Consequently there is a need, as identified by the inventors, for a filtering arrangement that reduces the loss for the receive path.

For transmitting, a first transmitted signal from the first base station BS1 is fed from the input/output of the first base station BS1 to the second duplex filter DPX2. Subsequently the signal is also fed to the first input of the multi carrier power amplifier MCPA for amplification. A second transmitted signal from the second base station BS2 is initially fed from an input/output of the base station BS2 to the third duplex filter DPX3. Then, the signal is fed to the second input of the multiple carrier power amplifier system MCPA for amplification. The two transmitted signals are then amplified and fed as one output signal from the multi carrier power amplifier system MCPA to the transmitter band-pass filter TXBP. The filtered signal is fed to the first duplex filter DPX1 and finally to the antenna feeder for transmitting on the antenna.

Due to the plurality of modules (DPX1; DPX2-MCPA-TXBP-DPX) the inaccuracy of the output power is large for the transmit path. At the same time it is difficult to balance the output power from the amplifier system MCPA with the output power from the antenna.

Due to the above described problems there is a need for a filtering arrangement that reduces the insertion loss for the receiving path and optionally also improves the accuracy of the output power for the transmitting path.

Basically, an embodiment of the present invention comprises a simplified filtering arrangement as compared to the above described prior art, wherein the transmit band-pass filter TXBP on the transmit path, the first and second duplex filters DPX and their connecting cable on the Rx path are reduced to one external filter module EFM, thereby simplifying the architecture.

Figure 2:
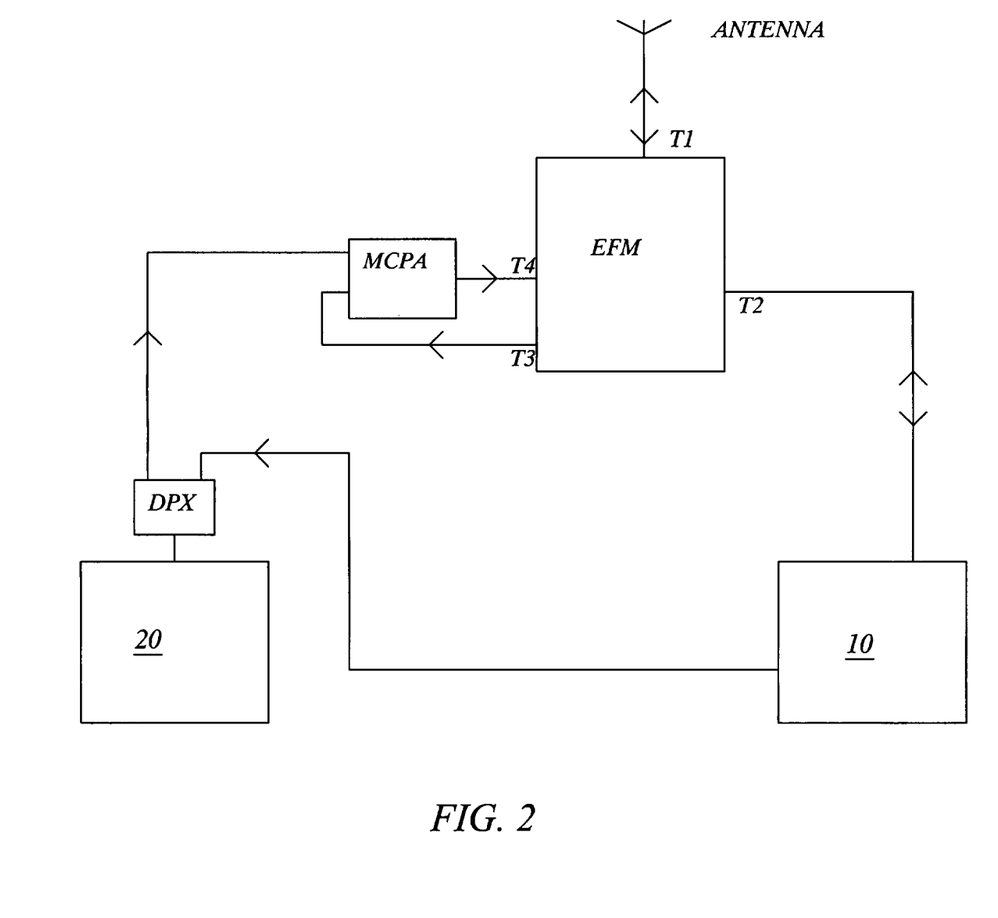
FIG. 2 illustrates an embodiment of an arrangement of the present invention.

With reference to FIG. 2, a system utilizing an embodiment of an external filter module EFM according to the invention will be described. The filter module EFM comprises at least four terminals T1, T2, T3, T4 for connection to a common antenna structure, a multi carrier power amplifier system MCPA, and at least two transceiver modules 10, 20.

The first terminal T1 is adapted to be connected to the common antenna structure, for receiving signals intended for and transmitting signals originating in the transceiver modules 10, 20. The second terminal T2 is adapted to be connected to a duplex transmission line from the first transceiver module 10, for providing received signals intended for the transceiver modules 10, 20, and to receive first transmitted signals from the first transceiver module 10. The third terminal T3 is adapted to be connected to a first input terminal of the multi carrier power amplifier system MCPA, for providing the first transmitted signals from the first transceiver module 10 to be amplified. The fourth terminal T4 is adapted to be connected to an output of the multi carrier power amplifier system MCPA, for receiving combined and amplified transmitted signals originating in the two transceiver modules 10, 20. Second transmitted signals from the second transceiver module 20 are provided as input signals at a second input terminal of the multi carrier power amplifier system MCPA.

Figure 3:
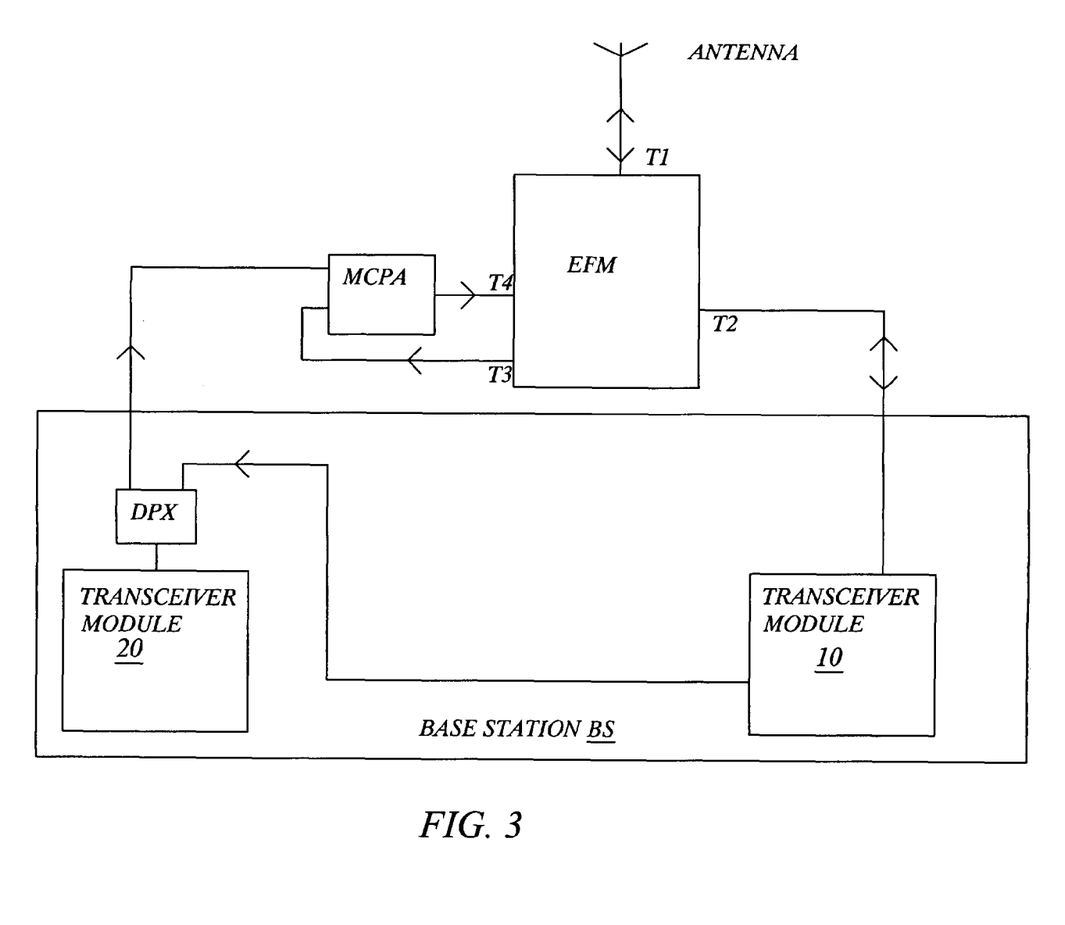
FIG. 3 illustrates another embodiment of an arrangement of the present invention.
Figure 4:
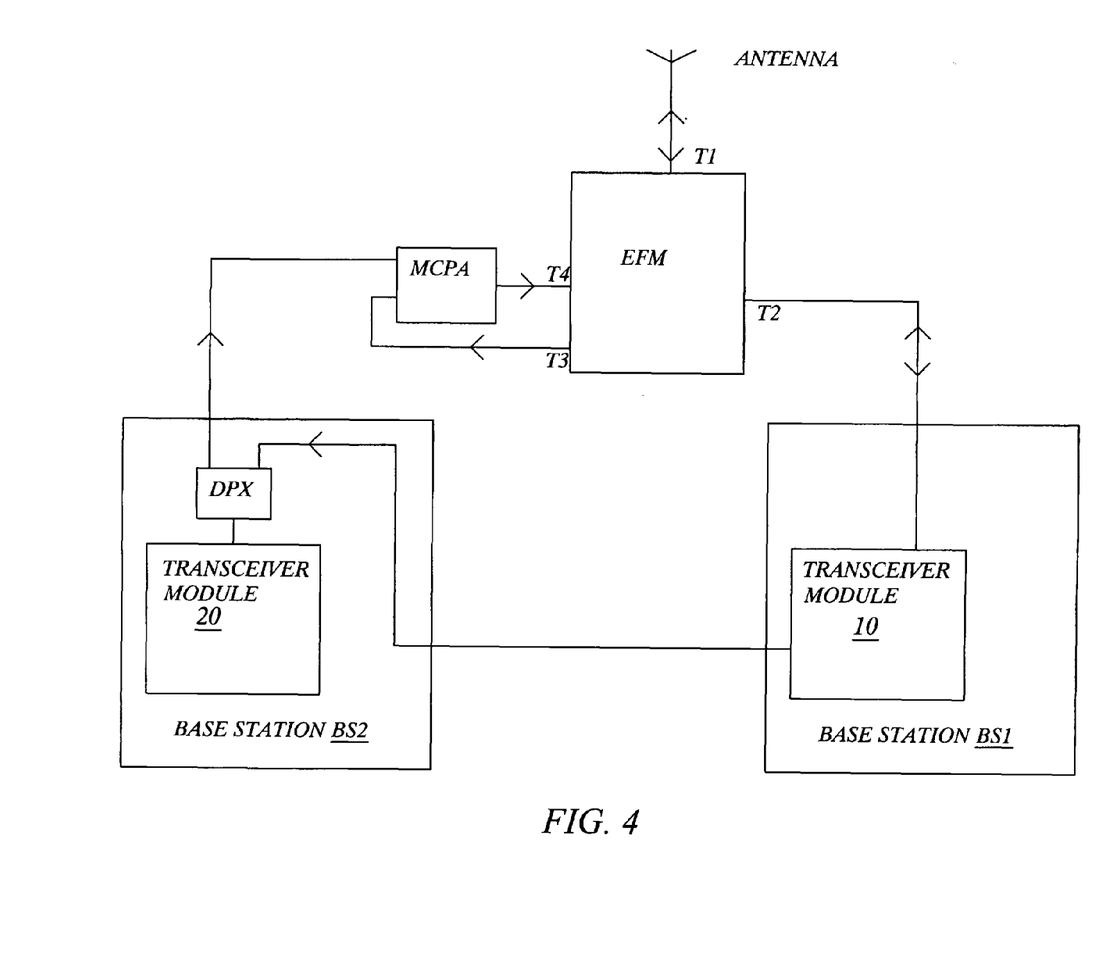
FIG. 4 illustrates another embodiment of an arrangement of the present invention.

The transceiver modules 10, 20 can be located in one network node e.g. radio base station BS as is illustrated in FIG. 3, or located in separate network nodes e.g. radio base stations BS1, BS2 as is illustrated in FIG. 4.

Figure 5:
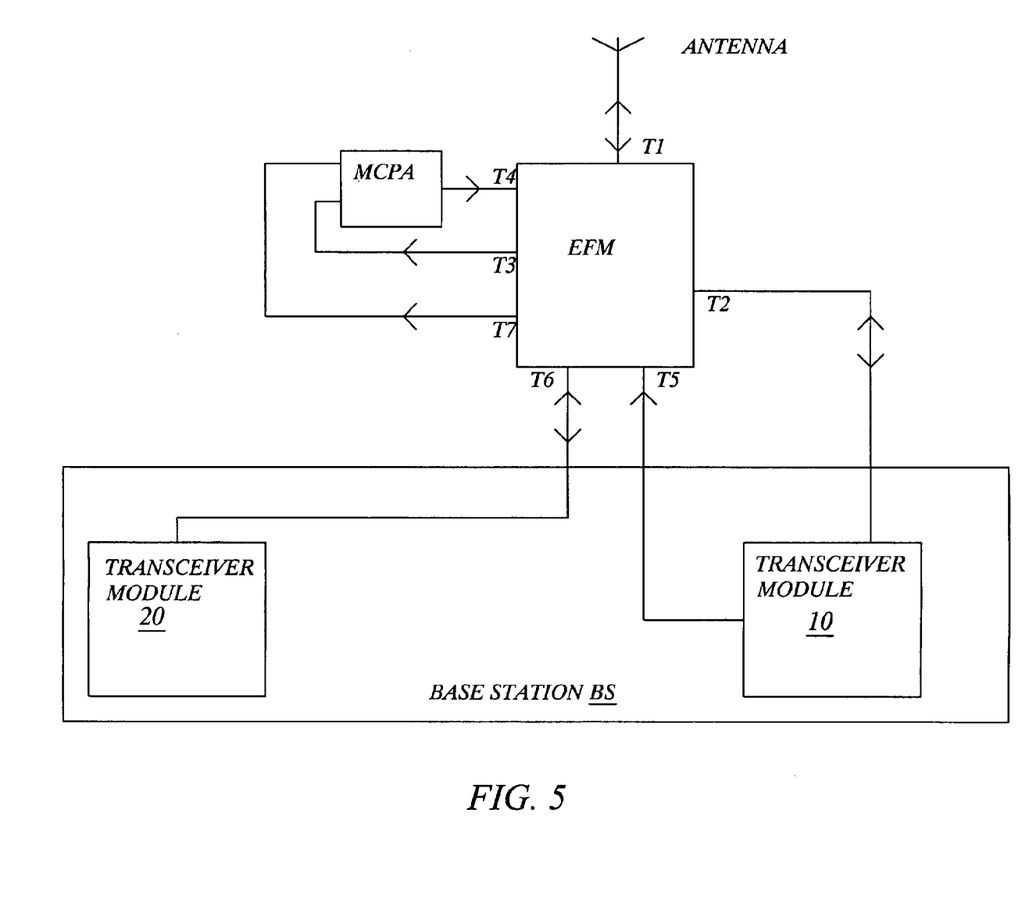
FIG. 5 illustrates another embodiment of an arrangement of the present invention

With reference to FIG. 5, another embodiment of the external filter module EFM according to the invention comprises (in addition to the previously described four terminals T1, T2, T3, T4) a fifth T5, a sixth T6 and a seventh T7 terminal. The fifth terminal T5 is adapted for receiving signals intended for the second transceiver module 20 from the first transceiver module 10. The sixth terminal T6 is adapted for handling duplex signals for the second transceiver module 20 e.g. providing received signals to the second transceiver module 20 and receiving transmitted signals from the second transceiver module 20. The seventh terminal T7 is adapted to be connected to a second input terminal of the multi carrier power amplifier system MCPA, for providing the transmitted signals from the second transceiver module 20 to be amplified.

Figure 6:
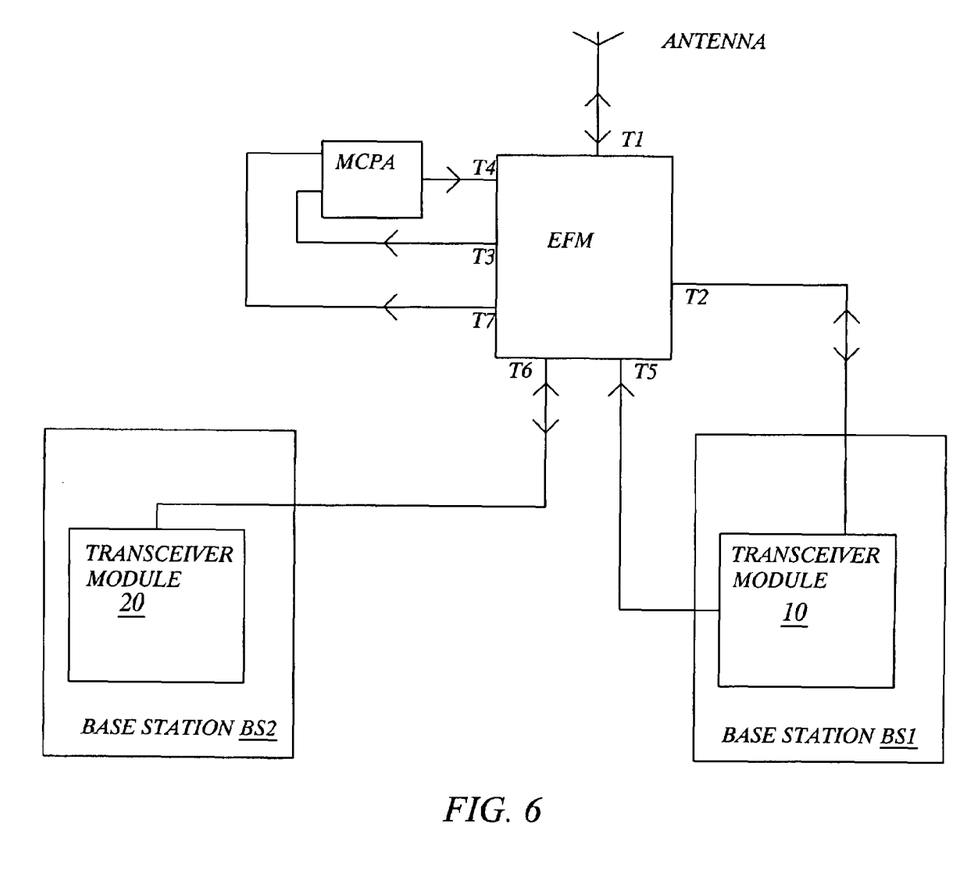
FIG. 6 illustrates another embodiment of an arrangement of the present invention

As previously stated with connection to FIGS. 2-4, the transceiver modules 10, 20 can be located in one radio base station BS as is illustrated in FIG. 5, or located in separate radio base stations BS1, BS2 as is illustrated in FIG. 6.

Figure 7:
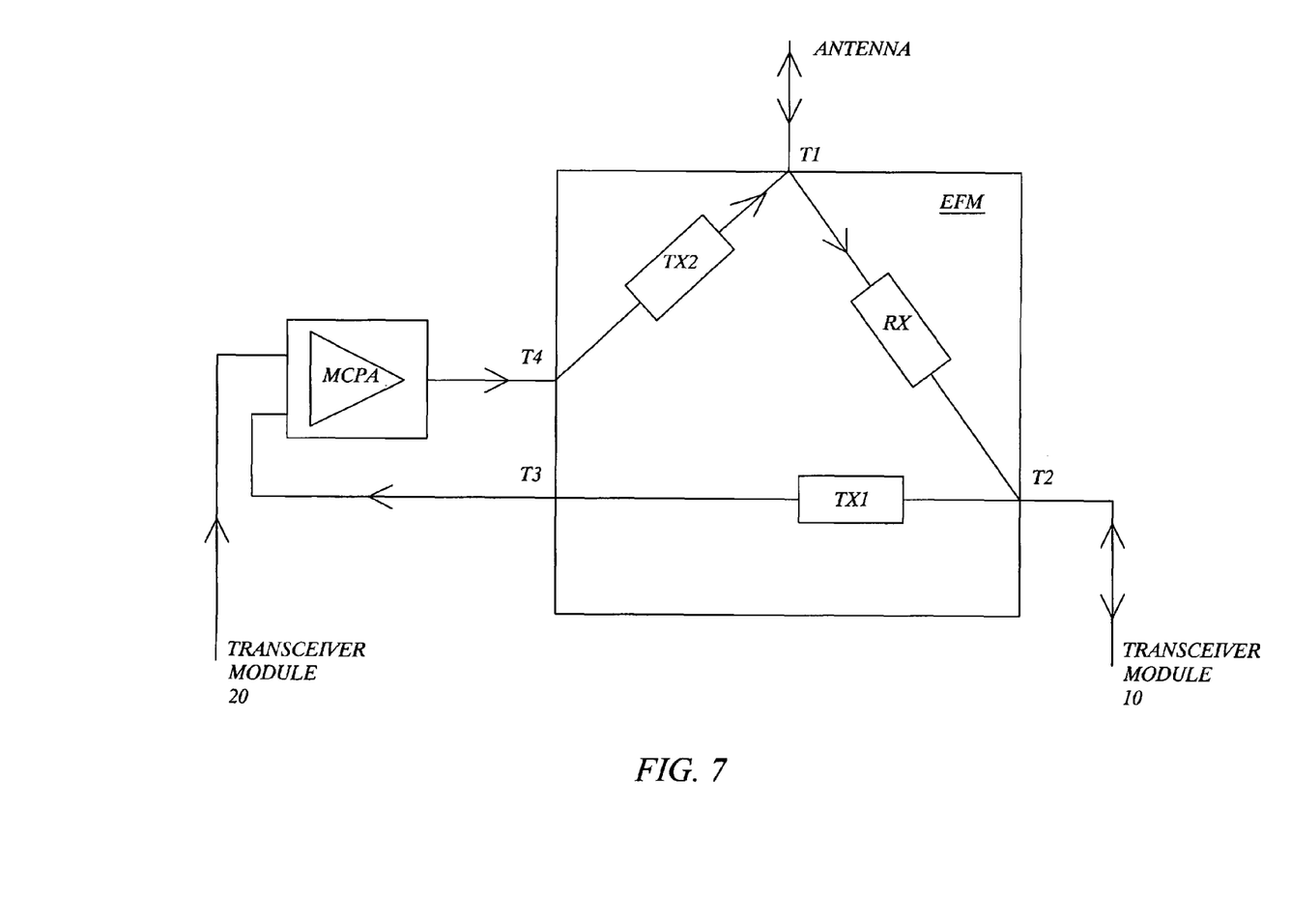
FIG. 7 illustrates a detailed embodiment of FIG. 2-4.

With reference to FIG. 7 a detailed embodiment of the filter arrangement or module EFM of FIGS. 2-4, for illustration purposes connected to a multi carrier power amplifier system MCPA, comprises three single filters RX, TX1, TX2. The first single filter RX connects the first terminal T1 and the second terminal T2 of the filter arrangement EFM. The second single filter TX1 connects the second terminal T2 and the third terminal T3 of the filter arrangement EFM. Finally, the third single filter TX2 connects the fourth terminal T4 and the first terminal T1.

According to the embodiment in FIG. 7 the first filter RX is a receiver filter for providing signals received at the antenna to intended respective transceiver modules 10, 20. The second filter TX1 is a transmitter filter for providing transmitted signals originating in the first transceiver module 10 to an input terminal of the multi carrier power amplifier system MCPA. Finally, the third filter TX2 is also a transmitter filter for providing transmitted signals originating in the transceiver modules 10, 20 via the multi carrier power amplifier system MCPA to the antenna for transmitting.

This embodiment provides a receiver path with low insertion loss as compared to prior art.

Figure 8:
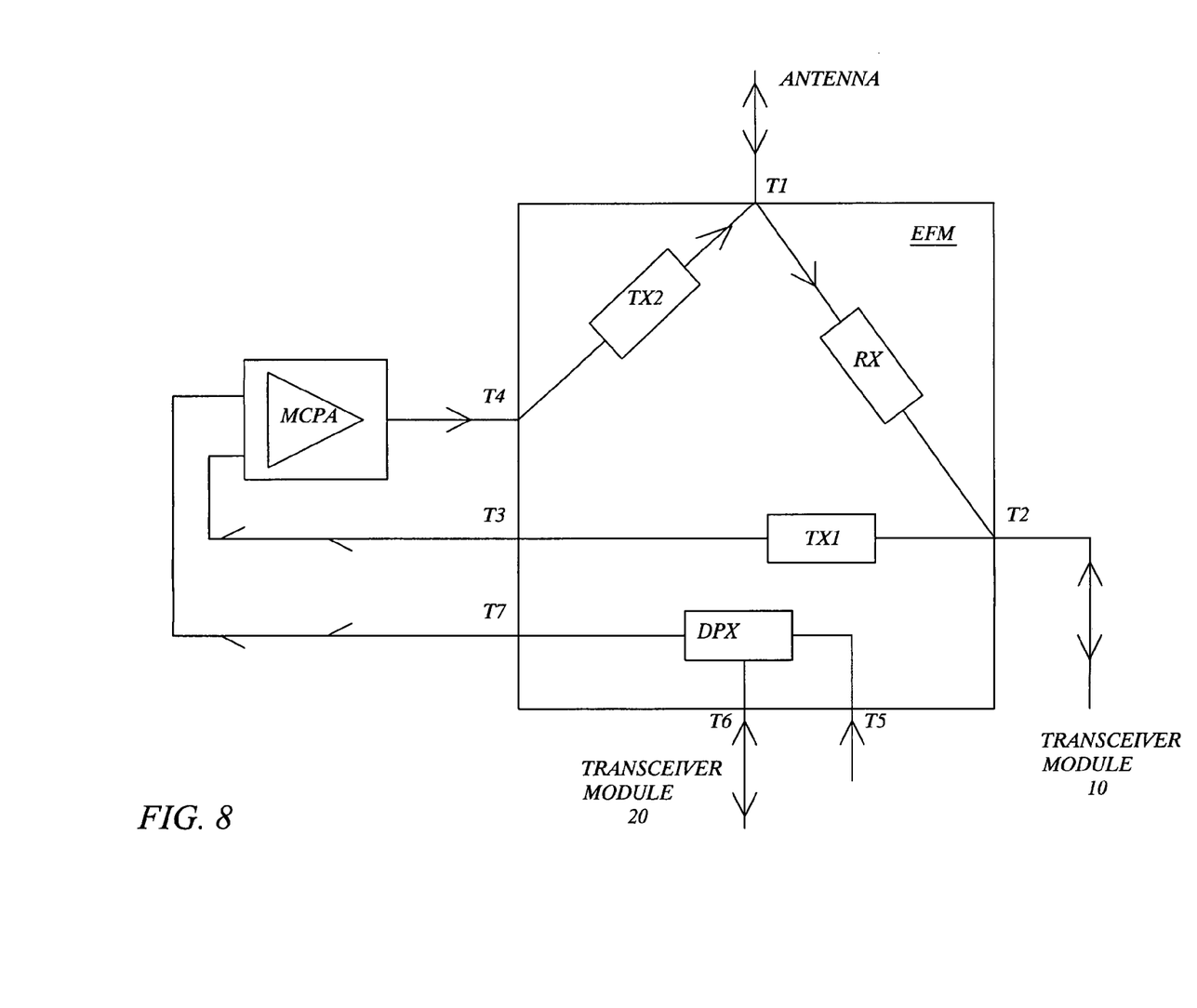
FIG. 8 illustrates a detailed embodiment of FIG. 5-6

With reference to FIG. 8, a detailed embodiment of the filter arrangement or module EFM of FIGS. 5-6, for illustration purposes connected to a multi carrier power amplifier system MCPA, comprises three single filters RX, TX1, TX2. These filters are arranged in the same manner as the single filters of the embodiment of FIGS. 2-4. In addition the external filter module EFM comprises a single duplex filter DPX arranged to connect the fifth terminal T5, the sixth terminal T6 and the seventh terminal T7.

Figure 9:
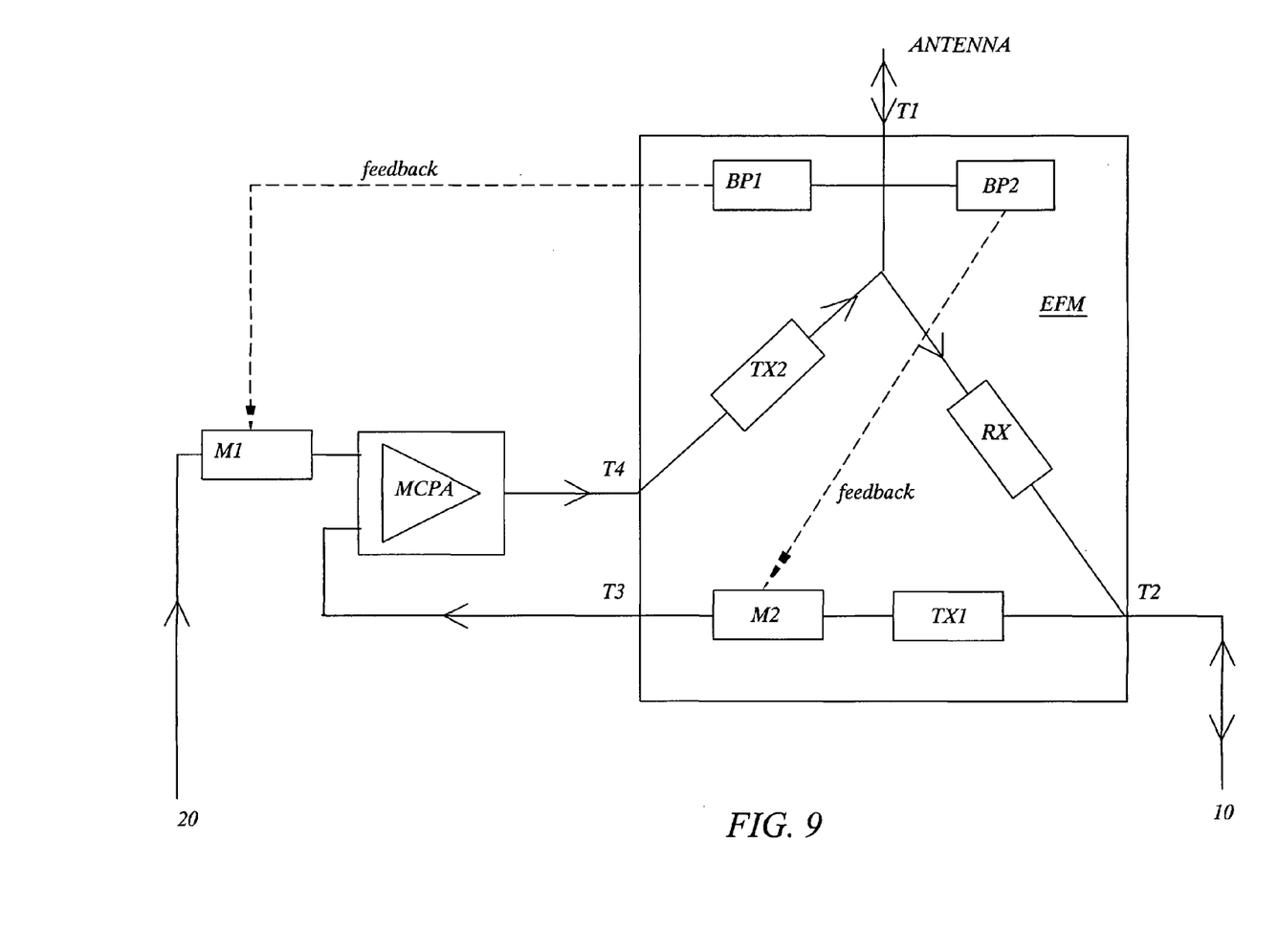
FIG. 9 illustrates another detailed embodiment of FIG. 2-4

With reference to FIG. 9 a further embodiment of a filter arrangement or module EFM according to the invention will be described. In order to enable attenuation of the respective input signals to the multi carrier power amplifier system MCPA a number of additional components are introduced as compared to the embodiment of FIG. 7. Two feedback units BP1, BP2 are provided at the first terminal T1. The first feedback unit BP1 is arranged to take a small portion of the signal to be transmitted, which comprises a combination of transmitted signals from both transceiver modules 10, 20 and filter out i.e. remove the contribution from the first transceiver module 10 from the combination. In essence, the feedback unit BP1 is configured to separate (or isolate) and analyze at least part of the combined signal originating in the second transceiver module 20. Equivalently, the second feedback unit BP2 is arranged to perform the same steps to filter out i.e. remove at least part of the transmitted signal from the second transceiver module 20 from the combined signal.

In a preferred embodiment the feedback units BP1, BP2 comprise band pass filters which are adapted to only allow a predetermined frequency band to pass. In other words, the first feedback unit BP1 comprises a first band pass filter adapted to only allow transmitted signals originating from the second transceiver module 20 to pass. Correspondingly, the second feedback unit BP2 comprises a second band pass filter adapted to only allow transmitted signals originating in the first transceiver module 10 to pass. Thereby, feedback relating to the transmitted signals from each respective transceiver modules 10, 20 can be supplied in order to adjust the amplification of the signals in the MCPA system.

In another preferred embodiment the respective feedback units BP1, BP2 comprise band stop filters arranged to stop predetermined frequency bands from passing.

In order to improve the accuracy of the output power it is, according to the invention, possible to introduce feedback loops for the respective transmit paths, as is also indicated in FIG. 9. This can be implemented by connecting first and second power adjustment units M1, M2 e.g. a step attenuator to respective input terminals of the multi carrier power amplifier system MCPA and supplying a feedback loop from the output of the respective feedback units BP1, BP2 to the attenuators. Since this is implemented for each feeder sharing transceiver module 10, 20 it is possible to individually adjust the respective transmitted signals in order to optimize the performance of the power amplifier system MCPA and the filter arrangement EFM. Accordingly, the accuracy of the transmit path is improved.

Preferably, the feedback units BP1, BP2 are further adapted to compare the respective transmit power to a predetermined transmit power target value, which value might be different for different bandwidths. If the transmit power is higher than the predetermined transmit power target value the respective feedback units are adapted to generate a feedback signal to increase the attenuation or decrease the gain of the power adjustment units. The same applies when the transmit power is lower than the transmit power target value, which generates a feedback signal to decrease the attenuation or increase the gain.

The target value can be set locally or set externally by means of data communication. Possible embodiments concerning how enable the above described attenuation or gain functionalities comprise:
1) utilizing a pre-set target value;
2) measuring the respective transmit power and comparing to a target value which is adapted by means of external data communication; and
3) the first feedback unit BP1 measuring the transmit power, providing the measurement result by means of data communication to an external processor unit which decides on how to adapt the attenuation/gain of power adjustment unit M1 and communicates the decided adaptation to the adjustment unit. The same is applicable for the second feedback unit BP2 and second power adjustment unit M2.

The external processor unit preferably comprises a processor located in a radio base station.

Figure 10:
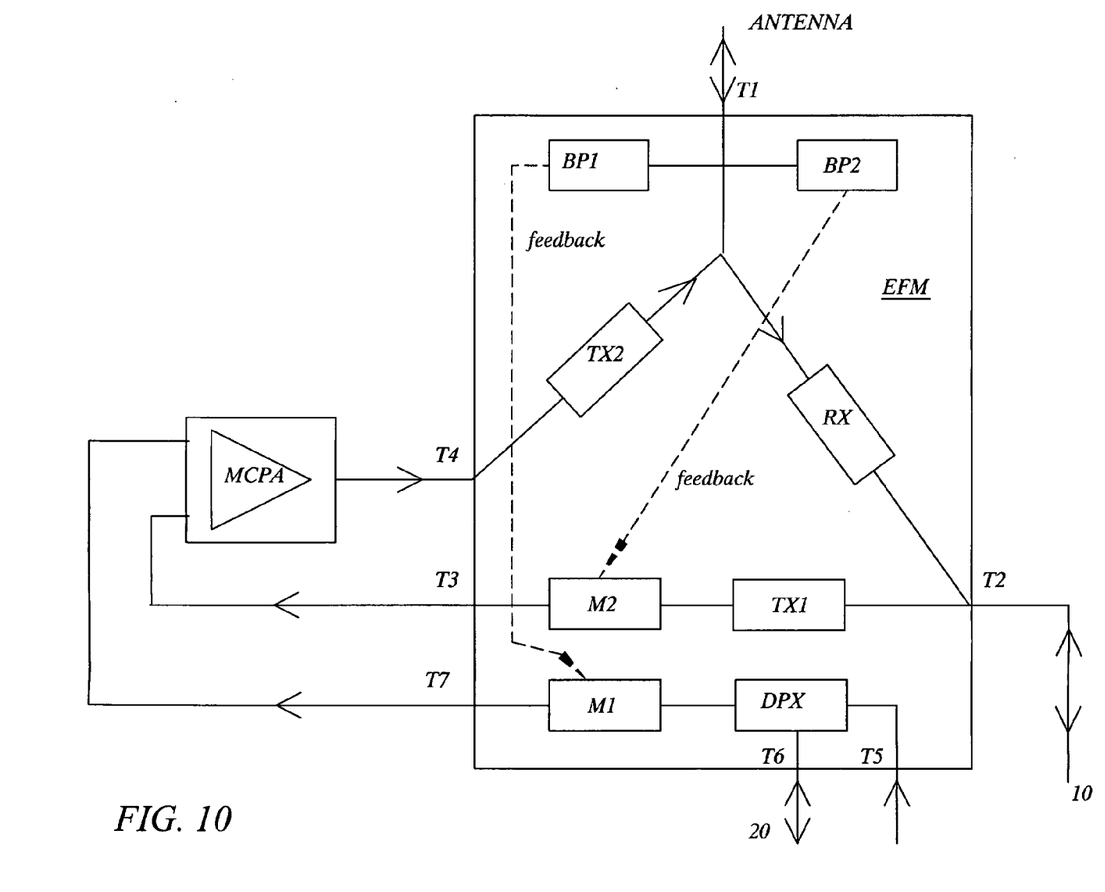
FIG. 10 illustrates another detailed embodiment of FIG. 5-6

In this embodiment one of the power adjustment units M1 is located outside the filter module EFM, however it is equally possible to locate the unit within the filter module EFM, as will be described below with reference to FIG. 10. With reference to FIG. 10, a preferred embodiment of the filter arrangement EFM with seven terminals T1, T2, T3, T4, T5, T6, T7 will be described. This embodiment differs from the embodiment of FIG. 8 with respect to the location of the first power adjustment unit M1. In this embodiment the first power adjustment unit M1 is connected between the duplex filter DPX and the seventh terminal T7. Thereby the entire filter functionality is contained within one external filter unit or module EFM.

The power adjustment units M1, M2 preferably are configured as electrically and/or mechanically variable attenuators such as voltage variable attenuator, digital step attenuator or electrically and/or mechanically variable amplifiers such as variable gain amplifier etc.

Below a description of methods according to the invention will be described, with reference to FIG. 11 and FIG. 12. The function of the filter arrangement according to the invention has been described above in relation to the different components of the various embodiments; thereby the following description is very general.

Figure 11:
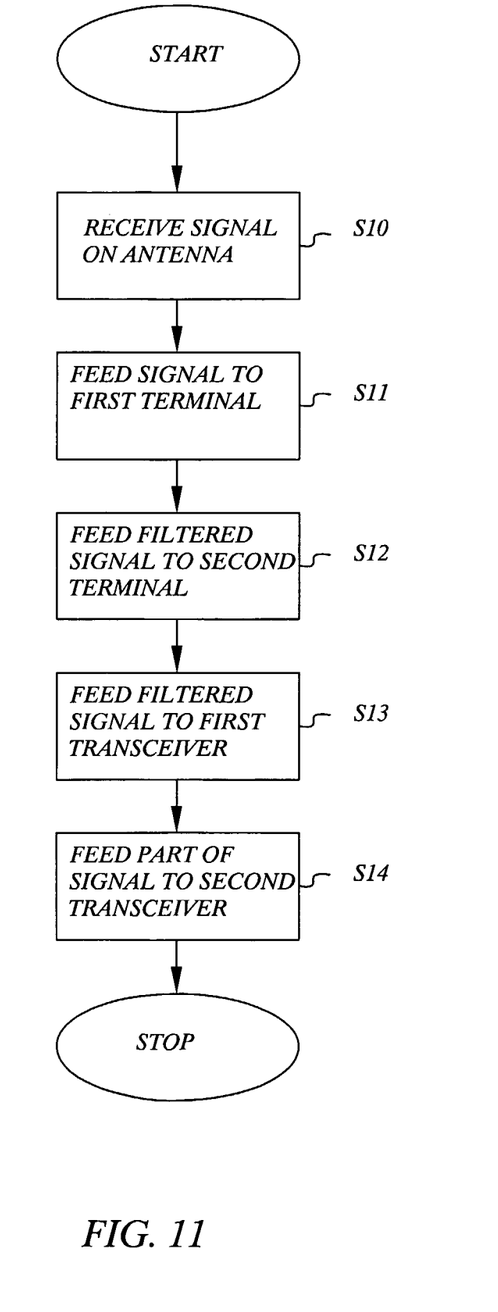
FIG. 11 illustrates an embodiment of a receiving method according to the invention.

FIG. 11 illustrates a general embodiment of receiving signals intended for at least two feeder sharing transceiver modules. The signals are received S10 at the shared antenna system and fed S11 to the first terminal of the filter arrangement. Subsequently, the received signal is filtered in the first filter unit and fed S12 to the second terminal of the filter arrangement and finally fed S13 to the first transceiver module.

According to one embodiment received signals intended for the second transceiver module are fed S14 from the first transceiver module to the second transceiver module. According to another embodiment, the signals are fed S14 from the first transceiver module to a fifth terminal of the filter module and are then filtered in a duplex filter unit and fed from a sixth terminal of the filter arrangement to the second transceiver module.

Figure 12:
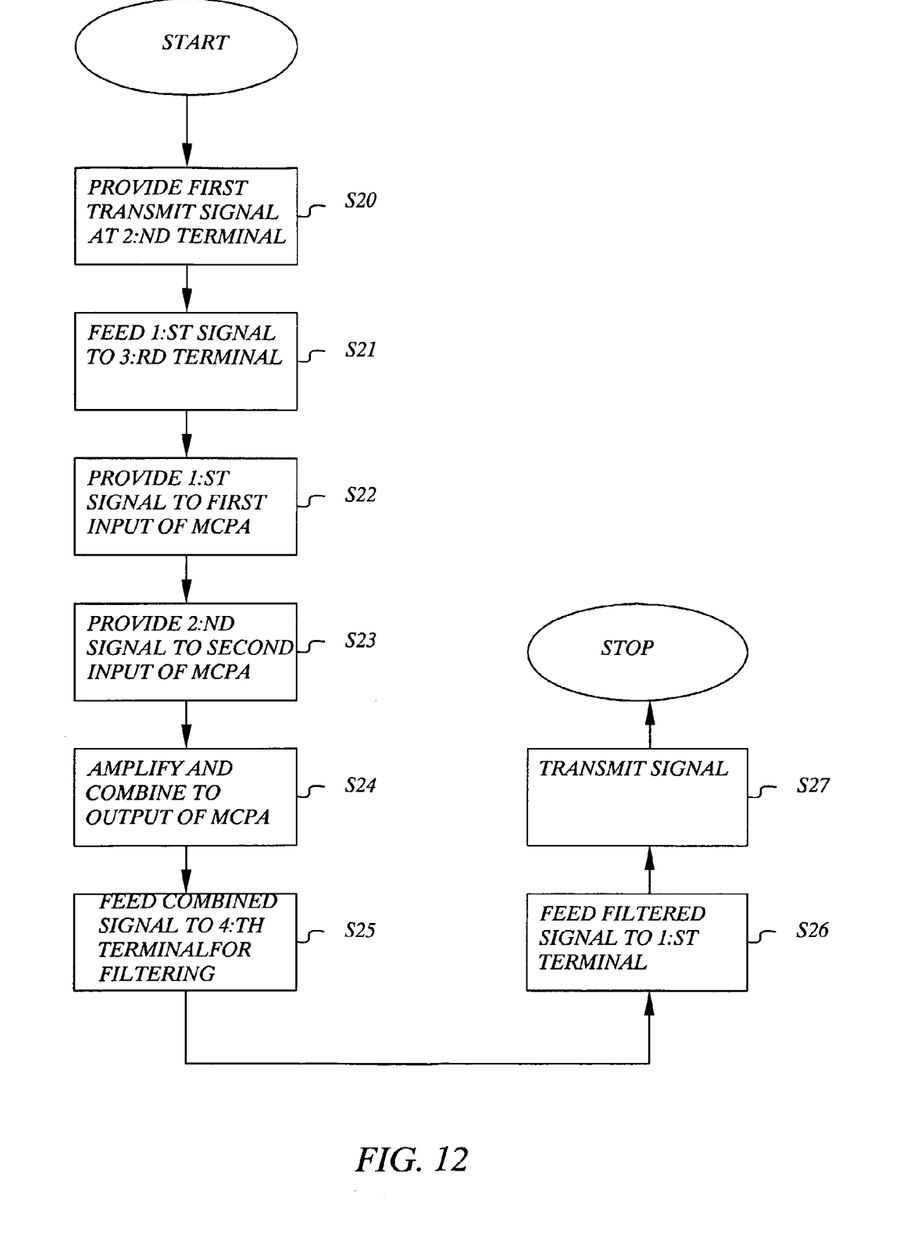
FIG. 12 illustrates an embodiment of a transmitting method according to the invention.

FIG. 12 illustrates a general embodiment of a method for transmitting signals from at least two feeder sharing transceiver modules in a telecommunication system.

Transmitted signals from the first transceiver module are supplied S20 at the second terminal of the filter arrangement and are filtered in the second filter means. Subsequently, the filtered signal is fed S21 to a third terminal of the filter arrangement and provided as an input signal at a first input of the multi carrier power amplifier system. Transmitted signals from the second transceiver module are supplied S23 at a second input of the multi carrier power amplifier system. In a next step S24 the transmitted signals from the at least two transceiver modules are combined and amplified in the multi carrier power amplifier system to an output signal and provided at an output of the amplifier. This output signal is fed S25 to a fourth terminal of the filter arrangement for filtering in the third single filter unit. Finally, the filtered signal is fed S26 to the first terminal and transmitted S27 on the antenna system.

According to a specific embodiment, the transmit signals from said second transceiver signal are received at a sixth terminal of the filter arrangement for filtering in the duplex filter. The filtered transmitted signal is fed to a seventh terminal of the external filter module, and is finally provided to the second input of the filter arrangement.

According to another specific embodiment the first input signal to the multi carrier power amplifier is adjusted, in the second power adjustment unit, in response to feedback from the second feedback means of the filter arrangement, and the second input signal to the multi carrier power amplifier is adjusted, in the first power adjustment unit, in response to feedback from the first feedback means.

In conclusion, the invention enables reduction of path loss for the receive path and optionally reduction of inaccuracy in the transmit-path.

Advantages of the present invention include:
Reduced insertion loss for the receiver path;
Increased power accuracy of the transmit path;
Simplified filter architecture;

It will be understood by those skilled in the art that various modifications and changes may be made to the present invention without departure from the scope thereof, which is defined by the appended claims.

The invention claimed is:

1. A filter arrangement, comprising:
    a first terminal arranged for handling duplex radio antenna feeder signals for at least two transceiver modules;
    a second terminal arranged for handling at least duplex signals for a first transceiver module;
    a third terminal arranged for outputting a first multi carrier power amplifier system input signal, said input signal representing a transmit signal from said first transceiver module;
    a fourth terminal arranged for receiving a multi carrier power amplifier system output signal, said output signal comprising an amplified representation of the transmit signals from said at least two transceiver modules;
        wherein said first terminal and said second terminal are connected via first single filter means, said second terminal and said third terminal are connected via second single filter means; and
        said fourth terminal and said first terminal are connected via third single filter means;
    a fifth terminal arranged for receiving received signals for a second transceiver module from said first transceiver module;
    a sixth terminal arranged for handling duplex signals for said second transceiver module; and
    a seventh terminal arranged for outputting a second multi carrier power amplifier system input signal;
        wherein said fifth, sixth and seventh terminals are connected by duplex filter means.

2. The arrangement according to claim 1, wherein said second terminal is additionally arranged to handle received signals for said at least two feeder sharing transceiver modules.

3. The filter arrangement according to claim 1, further comprising:
    first feedback means arranged at said first terminal, said first feedback means to provide feedback to first power adjustment means to adjust a second multi carrier power amplifier system input signal; and,
    second feedback means arranged at said first terminal, said second feedback means to provide feedback to second power adjustment means to adjust said first multi carrier power amplifier system input signal.

4. The filter arrangement according to claim 3, wherein said first feedback means are adapted to separate at least part of the transmitted signal originating in said second transceiver module, and said second feedback means are adapted to separate at least part of the transmitted signal originating in said first transceiver module.

5. The filter arrangement according to claim 3, wherein said first feedback means comprise
    a first band pass filter arranged to only allow transmitted signals originating in said second transceiver module to pass; and
    that said second feedback means comprise a second band pass filter arranged to only allow transmitted signals originating in said first transceiver module to pass.

6. The filter arrangement according to claim 3, wherein said first feedback means comprise
    a first band stop filter arranged to remove transmitted signals originating in said first transceiver module; and
    that said second feedback means comprise a second band stop filter arranged to remove transmitted signals originating in said second transceiver module.

7. The filter arrangement according to claim 3 wherein said first power adjustment means are connected between said duplex filter means and said seventh terminal.

8. The filter arrangement according to claim 3, wherein said second power adjustment means are connected between said second filter means and said third terminal.

9. The filter arrangement according to claim 3, wherein said power adjustment means comprise attenuators.

10. The filter arrangement according to claim 3, wherein said power adjustment means comprise gain amplifiers.

11. The filter arrangement according to claim 3, wherein said power adjustment means are arranged to be variable.

12. The filter arrangement according to claim 1, wherein said at least two transceiver modules are located in one network unit.

13. The filter arrangement according to claim 10, wherein said network unit is a radio base station comprising at least two antenna terminals.

14. The filter arrangement according to claim 1, wherein, said at least two transceiver modules are located in a respective of at least two network units.

15. The filter arrangement according to claim 12, wherein said at least two network units are radio base stations.

* * * * *

UNITED STATES PATENT AND TRADEMARK OFFICE
CERTIFICATE OF CORRECTION

PATENT NO. : 8,412,117 B2
APPLICATION NO. : 11/917776
DATED : April 2, 2013
INVENTOR(S) : Berglund et al.

It is certified that error appears in the above-identified patent and that said Letters Patent is hereby corrected as shown below:

On the Title page of Patent No. 8,412,117 at item (75), at column 1, line 1, delete "Jarfalla" and insert --Järfälla--

On the Title page of Patent No. 8,412,117 at item (75), at column 1, line 2, delete "Skarby, Lidingo" and insert --Skärby, Lidingö--

In the Specifications:
At column 2, line 12, delete "systems" and insert --systems.--
At column 2, line 46, delete "architecture;" and insert --architecture.--
At column 2, line 62, delete "invention" and insert --invention;--
At column 2, line 64, delete "invention" and insert --invention;--
At column 2, line 65, delete "FIG. 2-4." and insert --FIGS. 2-4;--
At column 2, line 66, delete "FIG. 5-6" and insert --FIGS. 5-6;--
At column 2, line 67, delete "FIG. 2-4" and insert --FIGS. 2-4;--
At column 3, lines 1-2, delete "FIG. 5-6" and insert --FIGS. 5-6;--
At column 7, line 50, delete "architecture;" and insert --architecture.--

In the Claims:
In Claim 1, at column 8, line 2, delete "modules;" and insert --modules,--
In Claim 1, at column 8, line 15, delete "signal;" and insert --signal,--
In Claim 5, at column 8, line 39, delete "comprise" and insert --comprise:--
In Claim 6, at column 8, line 47, delete "comprise" and insert --comprise:--
In Claim 7, at column 8, line 53, delete "claim 3" and insert --claim 3,--

Signed and Sealed this
Twenty-third Day of July, 2013

Teresa Stanek Rea
*Acting Director of the United States Patent and Trademark Office*